(12) United States Patent
Coulombe et al.

(10) Patent No.: US 7,023,559 B1
(45) Date of Patent: Apr. 4, 2006

(54) METHOD AND SYSTEM FOR MEASURING THE RELIEF OF AN OBJECT

(75) Inventors: Alain Coulombe, Brossard (CA); Michel Cantin, Brossard (CA); Alexandre Nikitine, Montreal (CA)

(73) Assignee: Solvision Inc., Brossard (CA)

( * ) Notice: Subject to any disclaimer, the term of this patent is extended or adjusted under 35 U.S.C. 154(b) by 434 days.

(21) Appl. No.: 10/031,031

(22) PCT Filed: Jul. 14, 2000

(86) PCT No.: PCT/CA00/00834

§ 371 (c)(1),
(2), (4) Date: Apr. 23, 2002

(87) PCT Pub. No.: WO01/06210

PCT Pub. Date: Jan. 25, 2001

(30) Foreign Application Priority Data

Jul. 14, 1999 (CA) .................................. 2277855

(51) Int. Cl.
*G01B 9/02* (2006.01)

(52) U.S. Cl. .................................................... 356/511
(58) Field of Classification Search ............... 356/2, 356/605, 601, 611, 613, 604, 511
See application file for complete search history.

(56) References Cited

U.S. PATENT DOCUMENTS

| | | |
|---|---|---|
| 3,821,558 A | 6/1974 | Mansfield |
| 3,943,278 A | 3/1976 | Ramsey, Jr. |
| 4,051,483 A | 9/1977 | Suzuki |
| 4,053,234 A | 10/1977 | McFarlane |
| 4,068,955 A | 1/1978 | Bodlaj |
| 4,192,612 A | 3/1980 | Bodlaj |
| 4,301,373 A | 11/1981 | Sjodin |
| 4,456,379 A | 6/1984 | Schumann et al. |
| 4,525,858 A | 6/1985 | Cline et al. |
| 4,634,281 A | 1/1987 | Eikmeyer |
| 4,657,394 A | 4/1987 | Halioua |
| 4,736,108 A | 4/1988 | Comstock et al. |
| 4,742,237 A | 5/1988 | Ozawa |
| 4,743,769 A | 5/1988 | Schwaiger et al. |

(Continued)

FOREIGN PATENT DOCUMENTS

EP  0 182 469  5/1996

(Continued)

*Primary Examiner*—Hwa (Andrew) Lee
(74) *Attorney, Agent, or Firm*—Merchant & Gould P.C.

(57) ABSTRACT

A method and a system for measuring the relief of an object are described herein. The system includes a grid projecting for projecting a grid, an image acquisition apparatus that includes a camera, and a computer. Providing a reference object having common elements with the object to measure, the method includes the steps of a) positioning the grid at three different known positions relative to the camera and the common elements; b) for each position of the grid, projecting the grid unto the reference object and, with the camera, taking an image of the reference object to yield three images having values for each pixel of the camera and c) computing the reference object phase for each pixel using the three reference object intensity values for the corresponding pixel. Steps a), b) and c) are repeated by replacing the reference object by the object to be measured. The difference of height between the object to be measured and the reference object for each pixel are then computed by subtracting the reference object phase and the object phase for the corresponding pixel.

16 Claims, 15 Drawing Sheets

U.S. PATENT DOCUMENTS

| | | |
|---|---|---|
| 4,803,371 A | 2/1989 | Durland |
| 4,939,380 A | 7/1990 | Berger et al. |
| 4,959,898 A | 10/1990 | Landman et al. |
| 4,962,569 A | 10/1990 | Hosel |
| 5,085,502 A | 2/1992 | Womack et al. |
| 5,102,224 A | 4/1992 | Uesugi et al. |
| 5,120,966 A | 6/1992 | Kondo |
| 5,133,601 A | 7/1992 | Cohen et al. |
| 5,175,601 A | 12/1992 | Fitts |
| 5,177,564 A | 1/1993 | Kato et al. |
| 5,307,151 A | 4/1994 | Hof et al. |
| 5,319,445 A | 6/1994 | Fitts |
| 5,327,082 A | 7/1994 | Gabura et al. |
| 5,396,332 A | 3/1995 | Ciszek |
| 5,442,573 A | 8/1995 | Bredberg et al. |
| 5,473,432 A | 12/1995 | Sorin |
| 5,647,588 A | 7/1997 | Stauber et al. |

FOREIGN PATENT DOCUMENTS

| | | |
|---|---|---|
| GB | 2 204 397 A | 11/1988 |
| WO | WO 88/02847 | 4/1988 |
| WO | WO 98/55826 | 12/1998 |

METHOD AND SYSTEM FOR MEASURING THE RELIEF OF AN OBJECT

FIELD OF THE INVENTION

The present invention generally relates to methods for measuring the relief of an object. More specifically, the present invention is concerned with the use of such systems and methods to inspect the lead coplanarity on circuit board.

BACKGROUND OF THE INVENTION

The use of interferometric methods to inspect the surface of an object for defects or to measure the relief of an object is well known. Generally stated, these methods consist in generating an interferometric pattern on the surface of the object and then analyzing the resulting interferometric image (or interferogram) to obtain the relief of the object. The interferometric image generally includes a series of black and white fringes.

Interferometric methods that require the use of a laser to generate the interferometric pattern are called "classic interferometric methods". In such classic methods, the wavelength of the laser and the configuration of the measuring assembly generally determine the period of the resulting interferogram. Classic interferometry methods are generally used in the visible spectrum to measure height variations in the order of micron.

However, it has been found difficult to use such method to measure height variations (relief on a surface showing variations beyond 0.5–1 μm when they are implemented in the visible spectrum. Indeed, the density of the black and white fringes of the resulting interferogram increases, causing its analysis to be tedious.

Another drawback of classic interferometric methods is that they require measuring assemblies that are particularly sensitive to noise and vibrations.

Surface inspection methods based on Moiré interferometry allow measuring the relief of an object in the visible spectrum with accuracy much more than the accuracy of classic interferometric methods. These methods are based on the analysis of the frequency beats obtained between 1) a grid positioned over the object to be measured and its shadow on the object ("Shadow Moiré Techniques") or 2) the projection of a grid on the object and another grid positioned between the object and the camera that is used to take a picture of the resulting interferogram ("Projected Moiré Techniques"). In both cases, the frequency beats between two grids produce the fringes of the resulting interferogram.

More specifically, the Shadow Moiré technique includes the steps of positioning a grid near the object to be measured, providing illumination from a first angle from the plane of the object (for example 45 degrees) and using a camera, positioned at a second angle (for example 90 degrees from the plane of the object), to take pictures of the interferogram.

Since the distance between the grid and the object varies, this variation of height produces a variation in the pattern of the interferogram. This variation in the pattern can then be analysed to obtain the relief of the object.

A drawback to the use of a Shadow Moiré technique for measuring the relief of an object is that the grid must be positioned very close to the object in order to yield accurate results, causing restrictions in the set-up of the measuring assembly.

The Projected Moiré technique is very similar to the Shadow Moiré technique since the grid, positioned between the camera and the object, has a function similar to the shadow of the grid in the Shadow Moiré technique. However, a drawback of the Projected Moiré technique is that it involves many adjustments and therefore creates more risk of inaccuracy in the results since it requires the positioning and tracking of two grids. Furthermore, the second grid tend to obscure the camera, preventing it from being used simultaneously to take other measurements.

A method and a system to measure the relief of an object free of the above-mentioned drawbacks of the prior-art are thus desirable.

OBJECTS OF THE INVENTION

An object of the present invention is therefore to provide an improved method and system for measuring the relief of an object.

Another object of the invention is to provide such a system suitable for lead coplanarity inspection.

SUMMARY OF THE INVENTION

More specifically, in accordance with the present invention, there is provided a method for measuring the relief of an object using a camera provided with an array of pixels, the method comprising:
  a) projecting a grid on a reference object; the grid being located at a first position relative to the camera and to the reference object;
  b) taking, with the camera, an image of the reference object illuminated by the projected grid; the image of the reference object having intensity values for each pixel;
  c) repeating steps a) and b) at least two times with the grid being located at two different known positions relative to the camera and to the reference object to yield at least three intensity values for each pixel;
  d) computing the reference object phase for each pixel using the at least three reference object intensity values for the corresponding pixel;
  e) projecting the grid on the object; the grid being located at the first position;
  f) taking with the camera an image of the object illuminated by the projected grid; the image of the object having intensity values for each pixel position;
  g) repeating steps e) and f) at least two times with the grid being located at the two different positions to yield at least three intensity values for each pixel;
  h) computing the object phase for each pixel position using the at least three object intensity values for the corresponding pixel; and
  i) computing the difference of height between the object and the reference object for each pixel using the reference object phase and the object phase for the corresponding pixel.

According to another aspect of the present invention, there is provided a system for measuring the relief of an object, the system comprising:
  a grid projecting assembly;
  an image acquisition apparatus including a camera provided with an array of pixels;
  a computer configured for
    a) receiving from the image acquisition apparatus at least three images of the projected grid onto the object and at least three images of the projected grid onto the reference object; each of the images of the projected grid onto the object corresponding to a different known position of the grid; each of the images of the projected grid onto the reference object corresponding to one of the known positions of the grid;

b) computing the reference object phase for each pixel using the at least three reference object intensity values for the corresponding pixel;

c) computing the object phase for each pixel using the at least three object intensity values for the corresponding pixel; and d) computing the difference of height between the object and the reference object for each pixel using the reference object phase and the object phase for the corresponding pixel.

Other objects, advantages and features of the present invention will become more apparent upon reading the following non-restrictive description of preferred embodiments thereof, given by way of example only, with reference to the accompanying drawings.

DESCRIPTION OF THE PREFERRED EMBODIMENT

Figure 1:
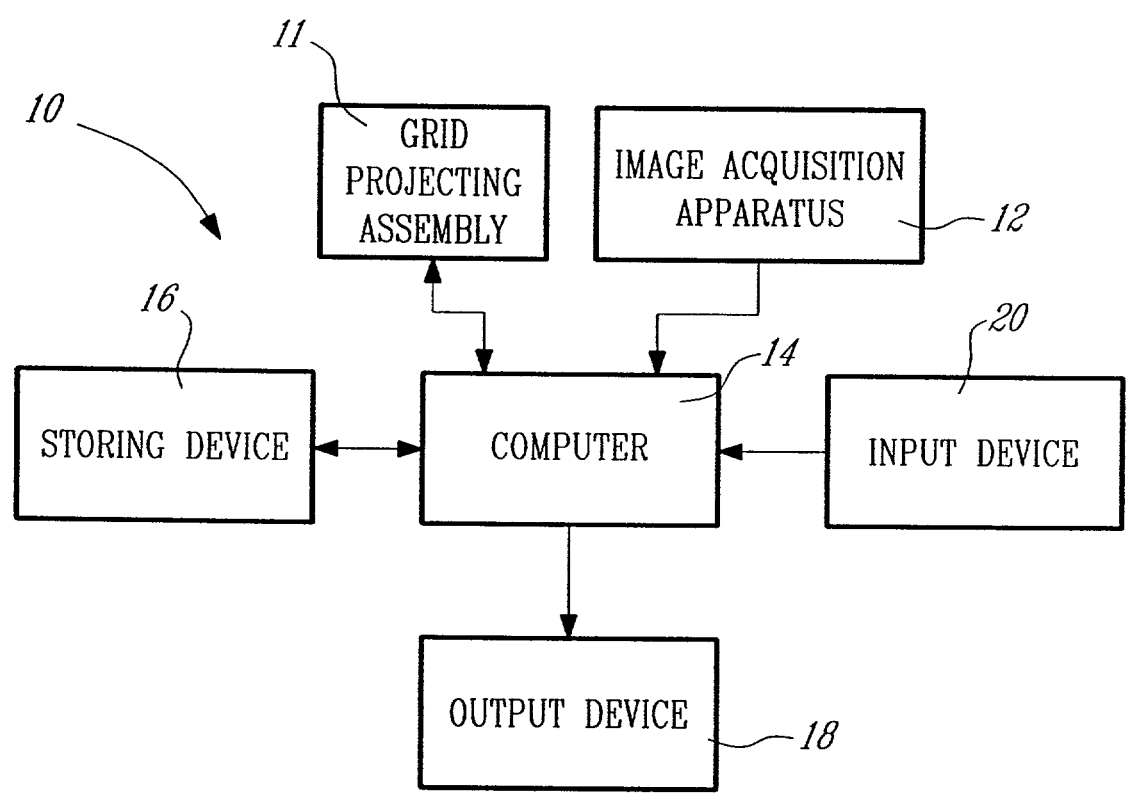
FIG. 1 is a schematic view of a system for inspecting the surface of an object according to an embodiment of the present invention.
Figure 2:
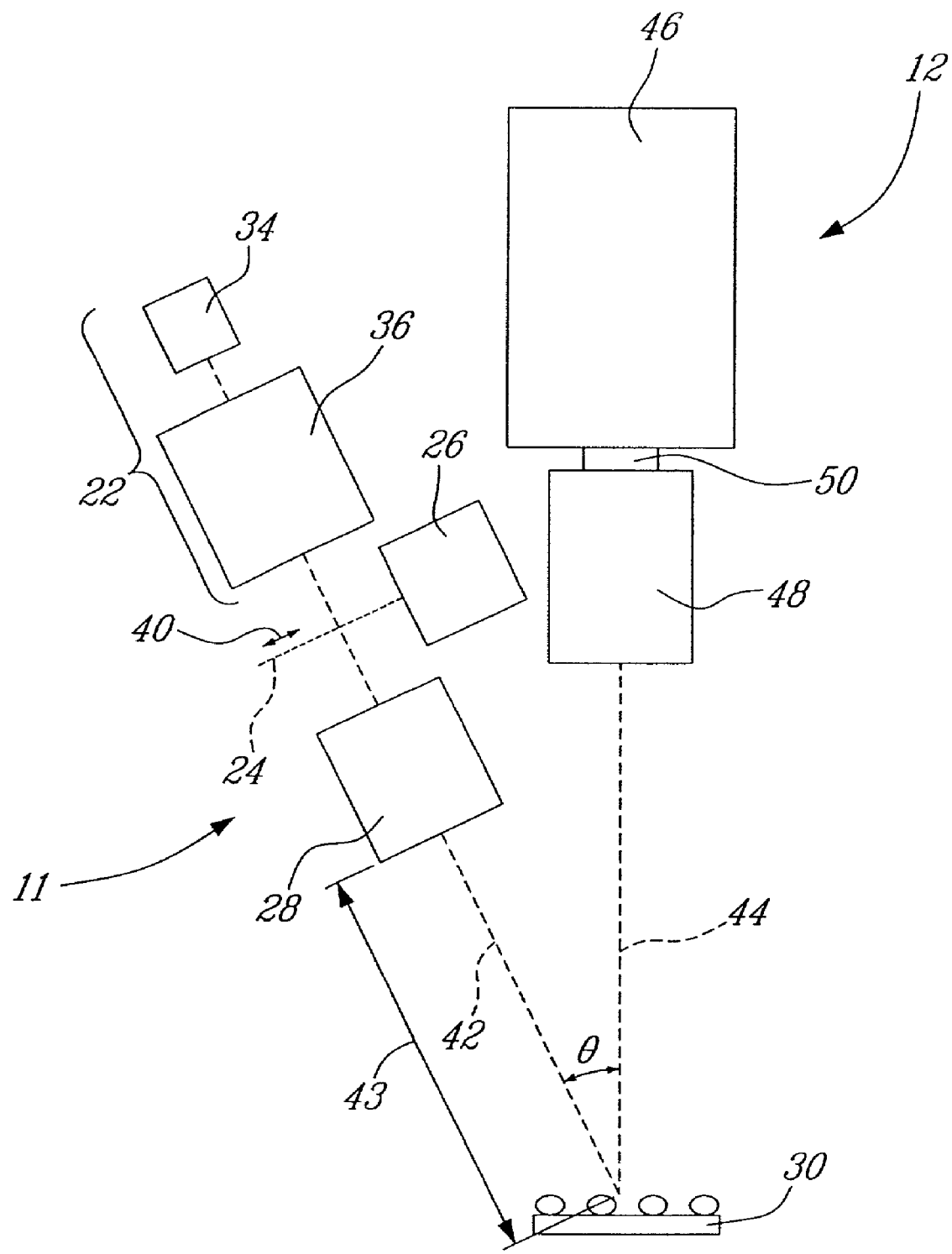
FIG. 2 is a schematic view of both the image acquisition apparatus and the grid projection assembly of FIG. 1.

Turning now to FIGS. 1 and 2 of the appended drawings, a system 10 for measuring the relief of an object, according to an embodiment of the present invention, will be described.

The surface inspection system 10 comprises a grid projecting assembly 11, an image acquisition apparatus 12, and a computer 14 advantageously provided with a storing device 16, an output device 18 and an input device 20.

Turning now more specifically to FIG. 2 of the appended drawings, the grid projecting assembly 11 and the image acquisition apparatus 12 will be described in more detail.

The grid projection assembly 11 includes an illuminating assembly 22, a grid 24 mounted to a movable support 26 and a projector 28.

The illuminating assembly 22 advantageously includes a source of white light 34 that is projected through the grid 24. For example, the source 34 is the end of an optical fiber (not shown) providing light from a white light source (not shown). An aspherical lens 36 or any other condenser is also advantageously used between the source 34 and the grid 24. Other light sources may also be used. It is also believed to be within the reach of a person skilled in the art to conceive another illuminating assembly within the spirit of the present invention.

The configuration of the grid 24 may vary depending on the resolution that is required to adequately measure the relief of the object 30. For example, it has been found that a ronchi ruling having 250 lines per inch allows to measure lead coplanarity of a circuit board, where a resolution around 1 mm is required.

The grid 24 is advantageously mounted to a moveable support 26 that allows displacement of the grid 24 in a direction perpendicular (see double arrow 40 on FIG. 2) to both the lines on the grid 24 and to the direction of incidence of the light (dashed line 42 on FIG. 2).

The movable support 26 is actuated by a stepping motor (not shown). The stepping motor is advantageously controlled by a micro-controller (not shown) triggered by the computer 14. Of course, the stepping motor could be directly controlled by the computer 14.

A projector 28, in the form of a 50 mm TV lens, is advantageously used to project the grid 24 onto the object 38.

The angle θ between the direction of incidence of the light (dashed line 42 on FIG. 2) and the line of sight of the image acquisition apparatus 12 (dashed line 44 on FIG. 2) may vary depending on the nature of the object 30 to be measured.

It is believed to be within the reach of a person skilled in the art to position the illuminating assembly 22, the grid 24 and the grid projector 28 relative to the object 30 to yield a projected grid having the desired pitch p onto the object 30.

For example, a ronchi grid, having a density of 250 lines per inch, with a distance 43 of 22 cm between the object 30 and the projector 28, and for an angle θ of 30 degrees, provides a projected grid having a 0.5 mm pitch p. Such a pitch is equivalent to a variation of height of about 1 mm on the surface of the object 30.

Obviously, the pitch of the projected grid will vary with the pitch of the grid 24.

As will be explained hereinbelow, the displacement of the projected grid 24 on the object 30 may alternatively be achieved by fixing the position of the grid 24 and by moving the object 30 and the camera 46 together.

It is to be noted that the system 10 does not require a grid between the camera 46 and the object 30. This advantage will be discussed hereinbelow.

The image acquisition apparatus 12 includes a camera 46, provided with an array of pixels, and is advantageously in the form of a CCD camera 46. Such a camera provides, for example, a resolution of 1300×1024 pixels.

The image acquisition apparatus 12 also advantageously includes a telecentric lens 48, advantageously mounted to the camera 46 via an optional extension tube 50.

The configuration of the image acquisition apparatus 12 and the distance between the apparatus 12 and the object 30 determines the field of view of the image acquisition apparatus 12. Alternatively, a desired field of view can be achieved without the extension tube 50 by distancing the camera 46 from the object 30.

The CCD camera can be replaced by a conventional camera when the computer 14 is configured to digitize the acquired images.

The computer 14 is advantageously configured to control the displacement of the grid 24, to process the images of the object 30 taken by the camera 46 and to analyze these images to measure the relief of the object 30.

The computer 14 is advantageously provided with memory means allowing storing of the images when they are processed by the computer 14 and therefore increasing the processing speed.

The storing device 16 can be, for example, a hard drive, a writable CD-ROM drive or other well-known data storing means. It can be directly connected to the computer 14, or remotely connected via a computer network such as the Internet. According to an embodiment of the invention, the storing device 16 is used to store both the images taken by the image acquisition apparatus 12, the relief of the object 30 and other intermediary results. Those files can be stored in any format and resolution that can be read by the computer 14.

The output device 20 allows visualization of the images and of the data produced by the computer 14, and can take many forms from a display monitor to a printing device.

The input device 18 can be a conventional mouse, a keyboard or any other well-known input device or combination thereof which allows inputting of data and commands into the computer 14.

The storing device 16, the display monitor 18 and the input device 20 are all connected to the computer 12 via standard connection means, such as data cables.

The computer 14 can be a conventional personal computer or any other data processing machine that includes a processor, a memory and input/output ports (not shown). The input/output ports may include network connectivity to transfer the images to and from the storing device 16.

Of course, the computer 12 runs software that embodies the method of the present invention thereof, as will be described hereinbelow.

It is to be noted that the system 10 includes adjustable support means (not shown) to position the image acquisition apparatus 12 and the grid projecting assembly 11 relative to each other and to the object 30. Alternatively, other registration means can be used without departing from the nature and spirit of the present invention.

Before giving a detail description of a method for measuring the relief of an object according to an embodiment of the present invention, the general theory underlying such a method will first be described. Since this theory is believed to be well known in the art and for concision purposes, it will only be briefly described herein.

The intensity I(x,y) for every pixel (x,y) on an interferometric image may be described by the following equation:

$$I(x, y) = A(x, y) + B(x, y) \cdot \cos(\Delta\Phi(x, y)) \quad (1)$$

where $\Delta\Phi$ is the phase variation (or phase modulation), and A and B are coefficient that can be computed for every pixel.

Knowing the phase variation $\Delta\Phi$, the object height distribution (the relief) at every point h(x,y) relative to a reference surface can be computed using the following equation (see FIG. 3):

$$h(x, y) = \frac{\Delta\Phi(x, y) \cdot p}{2\pi \cdot \tan(\theta)} \quad (2)$$

where p is the grid pitch and $\theta$ is the projection angle, as described hereinabove.

Figure 3:
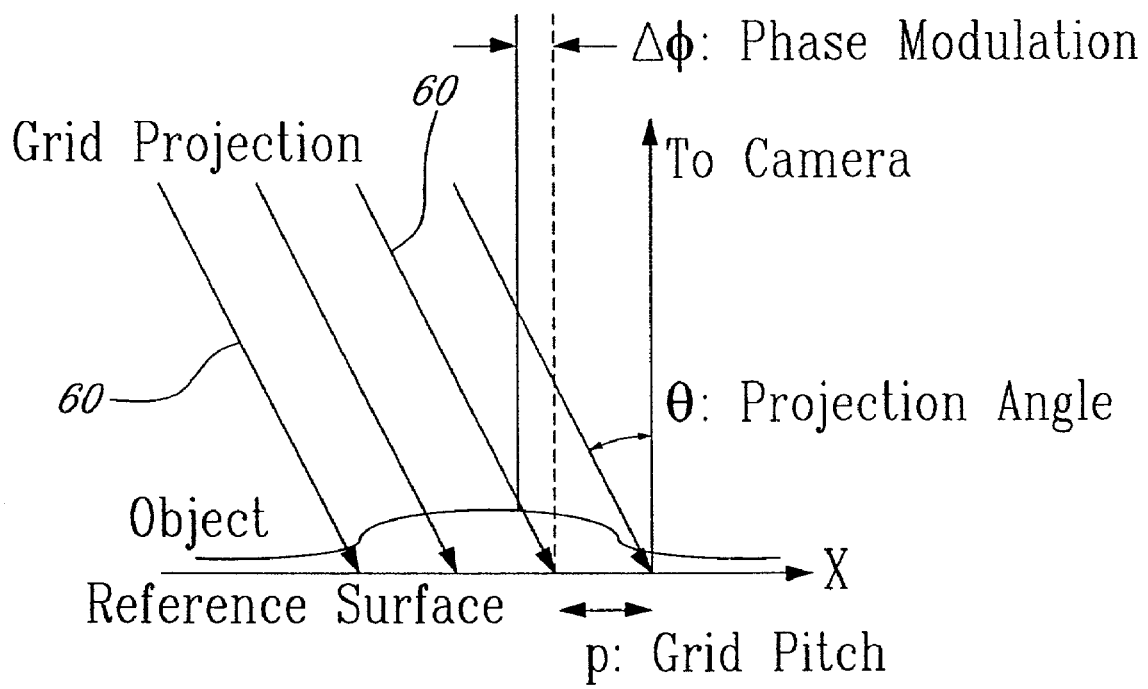
FIG. 3 is a schematic view illustrating the projection of a grid on an object.

Although the above equation is valid for a parallel projection of the grid on the object, as illustrated in FIG. 3 (note that the incidence ray 60 from the grid projection are parallel), it is believed to be within the reach of a person skilled in the art to use another equation if the grid projection is not parallel.

For example, it has been found with a pinhole projection that the pitch p and the angle $\theta$ increase with the distance from the grid on the plan of the reference surface (see x on FIG. 3). It has been found that with a first order approximation, variations in p and $\theta$ cancel each other out and the Equation 2 remains valid within a certain limit of the parameters.

It is believed within the reach of someone skilled in the art to re-evaluate the relation between the variation of height h(x,y) and the phase $\Delta\Phi$, and to make corrections to the relation according to the configuration of the system used to measure the relief.

Figure 4:
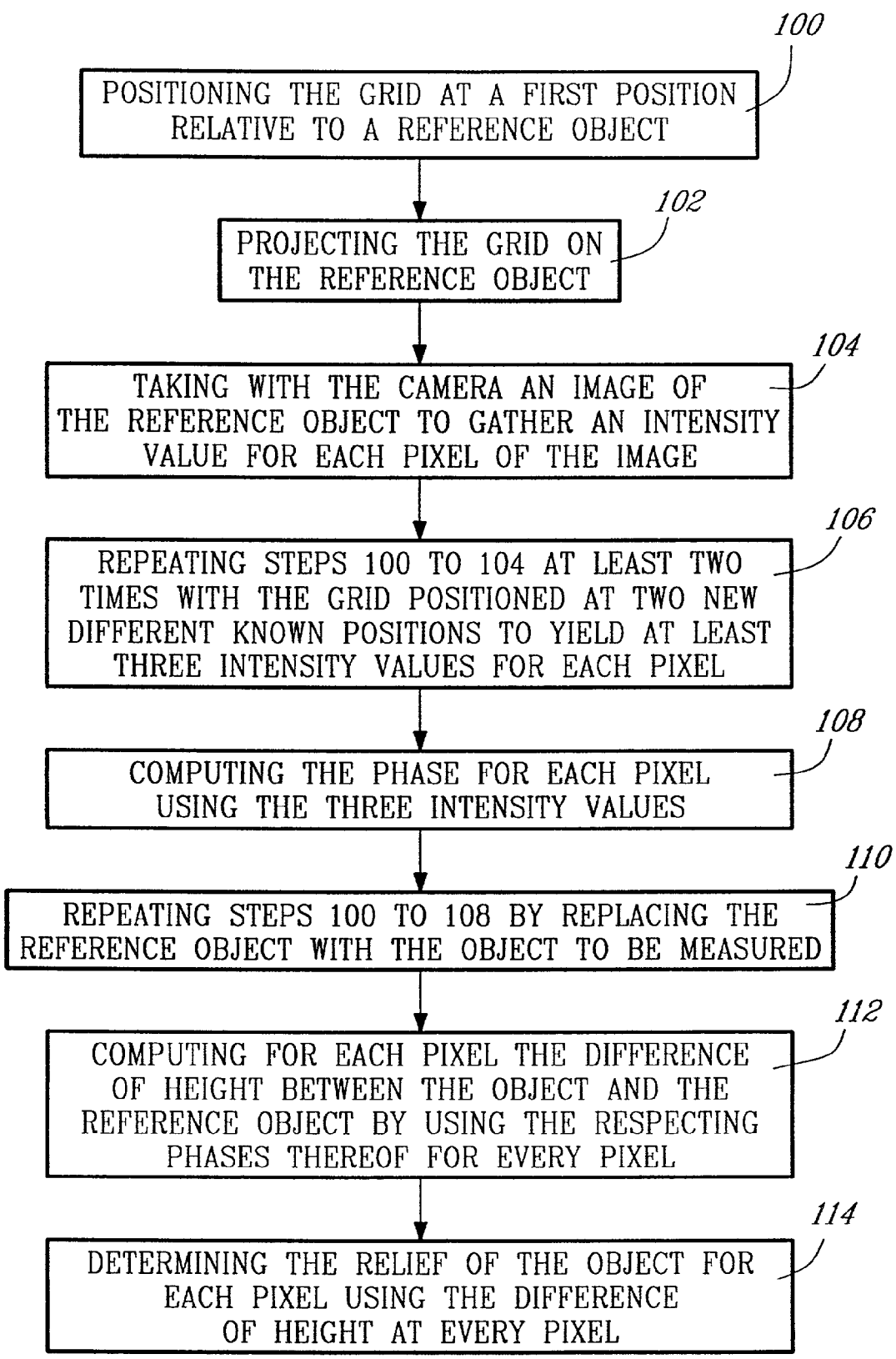
FIG. 4 is a block diagram of a method for measuring the relief of an object according to an embodiment of the present invention.

Turning now to FIG. 4 of the appended drawings, a method for measuring the relief of an object according to an embodiment of the present invention will be described in more detail.

Generally stated, the method consists in measuring the relief of an object 30 using the system 10 by performing the following steps:

- 100—positioning the grid 24 at a first position relative to a reference object;
- 102—projecting the grid 24 on the reference object;
- 104—taking, with the camera 46, an image of the reference object to gather an intensity value for each pixel of the image;
- 106—repeating steps 100 to 104 at least two times with the grid positioned at two new different known positions to yield at least three intensity values for each pixel;
- 108—computing the phase for each pixel using the three intensity values;
- 110—repeating steps 100 to 108 by replacing the reference object with the object 30 to be measured;
- 112—computing, for each pixel, the difference of height between the object 30 and the reference object by using the respecting phases thereof for every pixel; and
- 114—determining the relief of the object for each pixel using the difference of height at every pixel.

Figure 5:
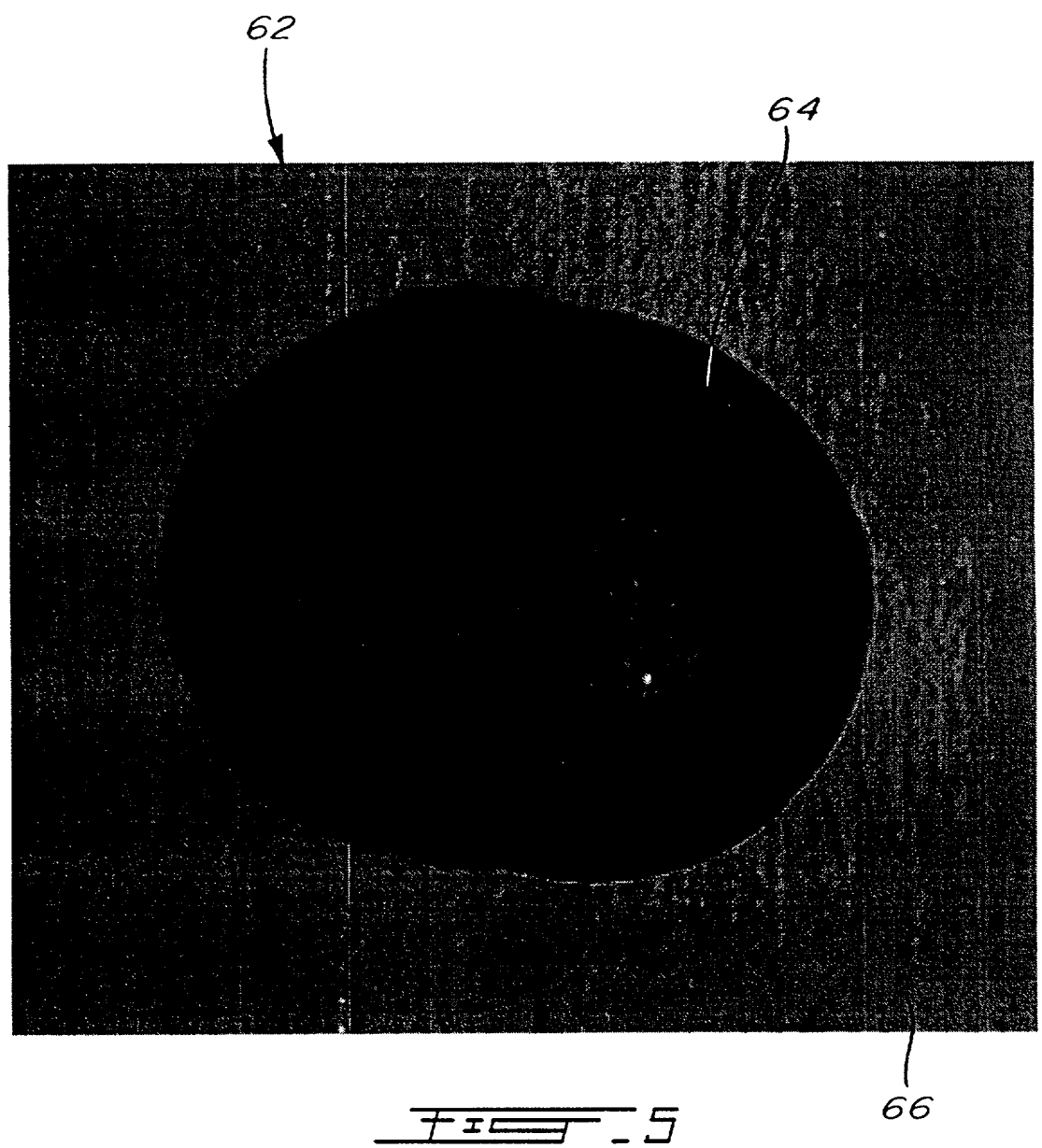
FIG. 5 is an image of a sphere mounted to a board, as taken by the system of FIG. 1.

These general steps will now be further described with reference to a first example where the object 62 to measure is a sphere 64 mounted to a board 66. An image of said object 62 can be seen in FIG. 5.

By choosing a similar board as the reference object, the difference of height between the object 62 and the reference object will provide the height of the sphere 64. The common element to the object 62 and the reference object is, in this example, the board 66.

In step 100, the grid 24 is moved to a first predetermined position using the support 26 that is actuated by the stepping motor. As it has been discussed hereinabove, the system 10 includes means to register and fix the position of the grid 24 and the camera 46 relative to the reference object (and later the object).

In step 102, the grid 24 is then projected onto the reference object.

In step 104, the camera 46 takes an image of the reference object.

The image includes an intensity value for each pixel of the image. The computer 14 stores these intensity values for future processing.

Figure 6:
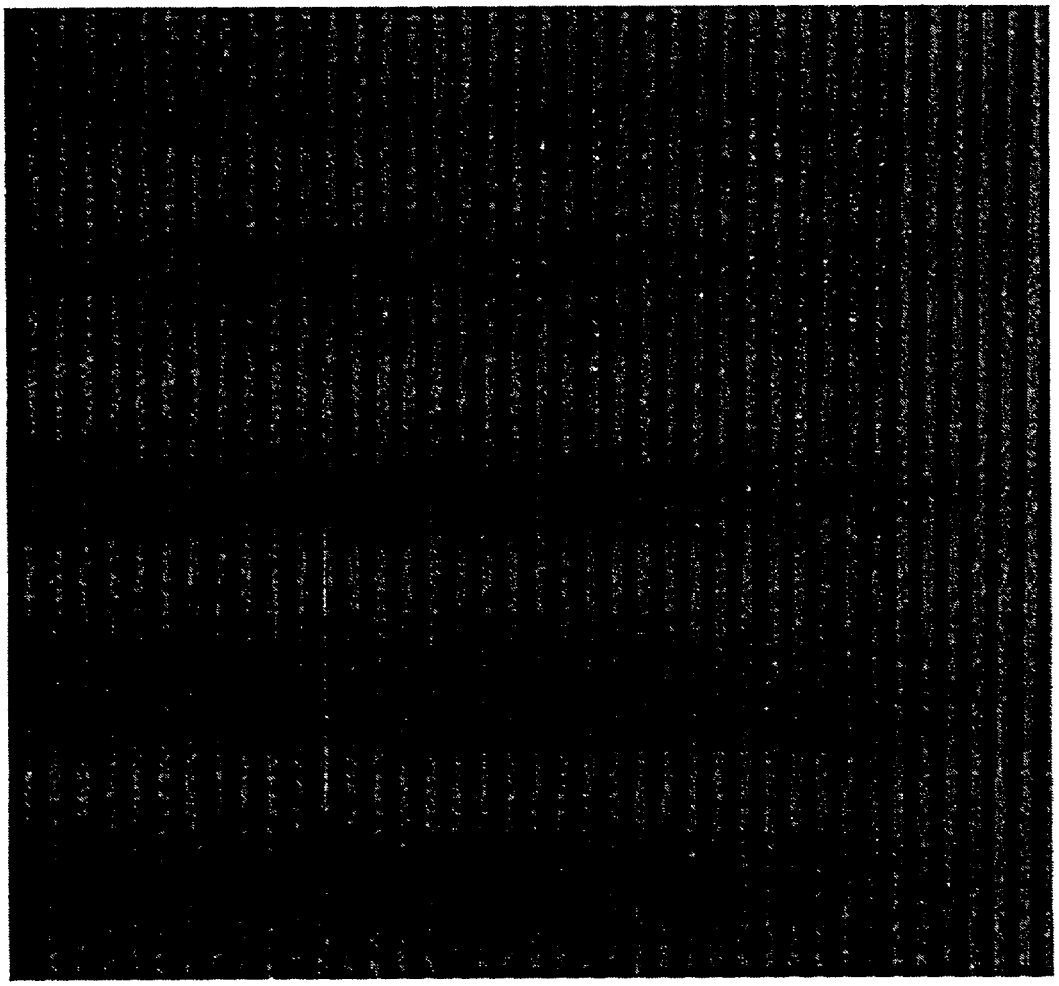
FIG. 6 is an image of the board of FIG. 5, illuminated by the grid.

Steps 100 to 104 are then repeated at least twice with the grid positioned at two new known different positions (step 106). This will provide three slightly different images and therefore the three intensity values for each pixel. One of the three images of the board illuminated by the grid 24 can be seen in FIG. 6.

Since Equation 1 comprises three unknowns, that is A, B and $\Delta\Phi$, three intensity values $I_1$, $I_2$ and $I_3$ for each pixel, and therefore three images, are required to compute the phase variation $\Delta\Phi$.

The two new images are taken following small translations of the grid 24 relative to the surface of the reference object. The displacements are so chosen as to yield phase variations in the images $\Delta\phi_1$, $\Delta\phi_2$ and $\Delta\phi_3$. This results in three equations similar to Equation 1 for each pixel of the pixel array of the camera 46:

$$I_n = A + B \cdot \cos(\Delta\Phi + \Delta\phi_n) \quad (3)$$

with n=1,3.

By solving the system of Equation 3, one obtains the value of $\Delta\Phi$. The displacements of the grid 24 are chosen so as to advantageously provide different values of $\Delta\phi_1$, $\Delta\phi_2$ and $\Delta\phi_3$.

According to a preferred embodiment of the present invention, more than three images are taken. This yield additional intensity values that can be used to increase the precision of the calculated phase.

Methods according to the prior-art often require the use of four images and all four values from these images are taken for phase estimation. Since a method according to the present invention requires only three images, additional images may be used to increase the precision and reliability of the method.

By keeping, for example, four (or more) images, it is possible to discard noisy pixels or images and to keep only the pixels having the most advantageous intensity values. Indeed, if one of the four intensity values is noisy (that can be caused, for example, by an image saturation), the corresponding intensity can be eliminated without compromising the precision of the resulting phase for this particular pixel.

Alternatively, more then three intensity values can be used to traditionally compute the phase using a numerical method such as a least square fit. However, such a method could not prevent erroneous phase values to be computed for certain pixels, potentially causing imprecision in the computation of the relief of the object.

According to another preferred embodiment of the present invention, the displacements of the grid between the second and third images (and the fourth image) are chosen so as to provide two images having 180 degrees phase variations $\Delta\phi_n$ (see Equation 3). This allows obtaining an image of the reference object (or of the object) without the projected grid. This can be achieved by adding the intensity values of the two images phase shifted by 180 degrees.

More generally, if the sum of the phase variations of some of the three or more images taken by the camera 46 is 360 degrees, a corresponding two-dimensional image can be obtained by adding the intensity values of these images for each pixel. This recomposed two-dimensional image does not include the projected grid. This image may be used to perform a preliminary analysis of the reference object (or of the object) that may speed-up any subsequent analysis that will be performed on the image or the values that will result from step 112.

In step 108, the phase is computed using the three intensity values (or the three best intensity values) for each pixel by solving the Equations 3. This can be achieved by using a conventional numerical method, for example. Numerical methods for solving such system of equation are believed to be well known in the art and will not be described herein.

Figure 7:
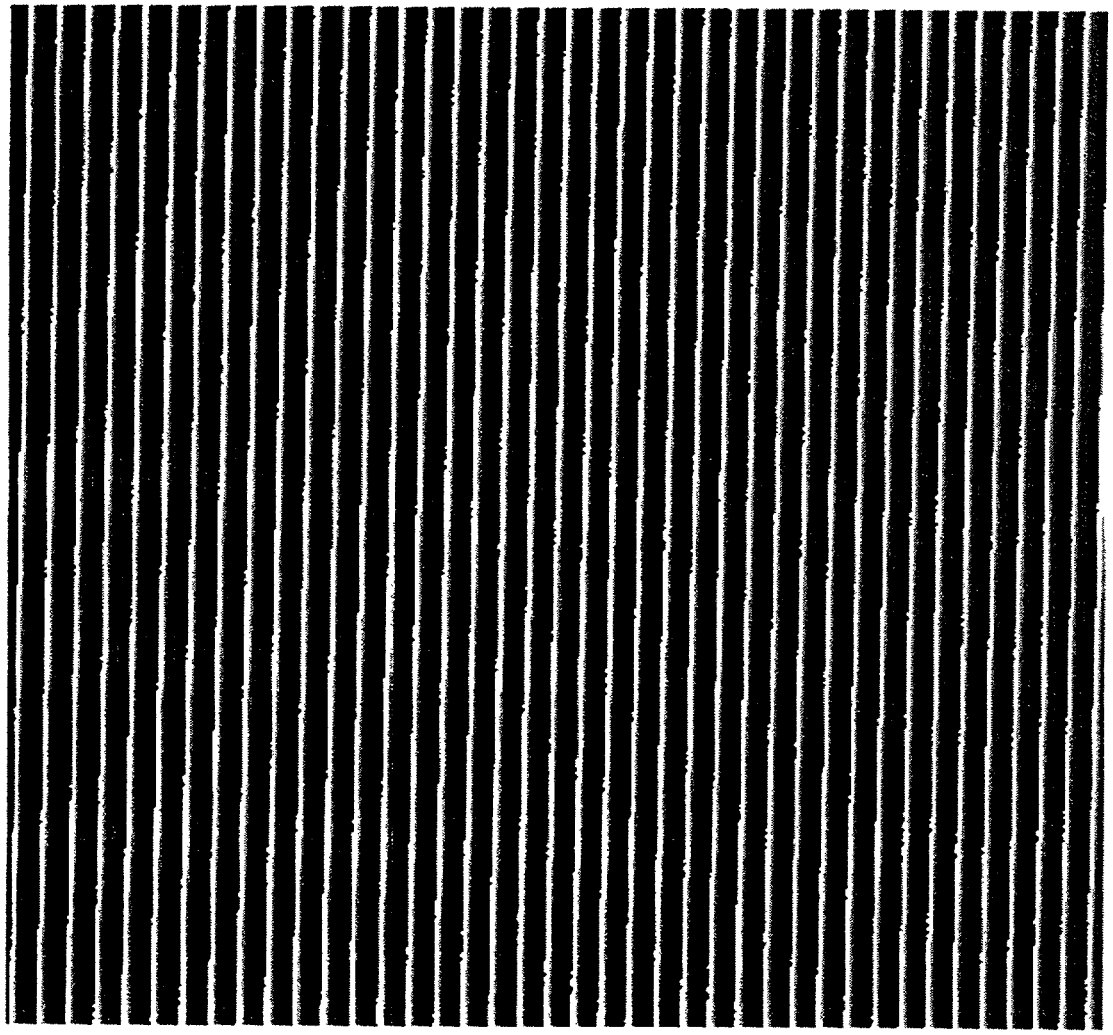
FIG. 7 is an image computed by the system of FIG. 1, representing the phase of the board of FIG. 6.

The resulting phase of the reference object for every pixel is illustrated in FIG. 7.

When the method of FIG. 4 is used to inspect a series of objects, steps 100 to 108 may be advantageously performed only once for the reference object before the inspection. This allows the increase of the speed of the inspection.

Steps 100 to 108 are repeated by replacing the reference object by the object to measure, i.e. the object 62.

Figure 8:
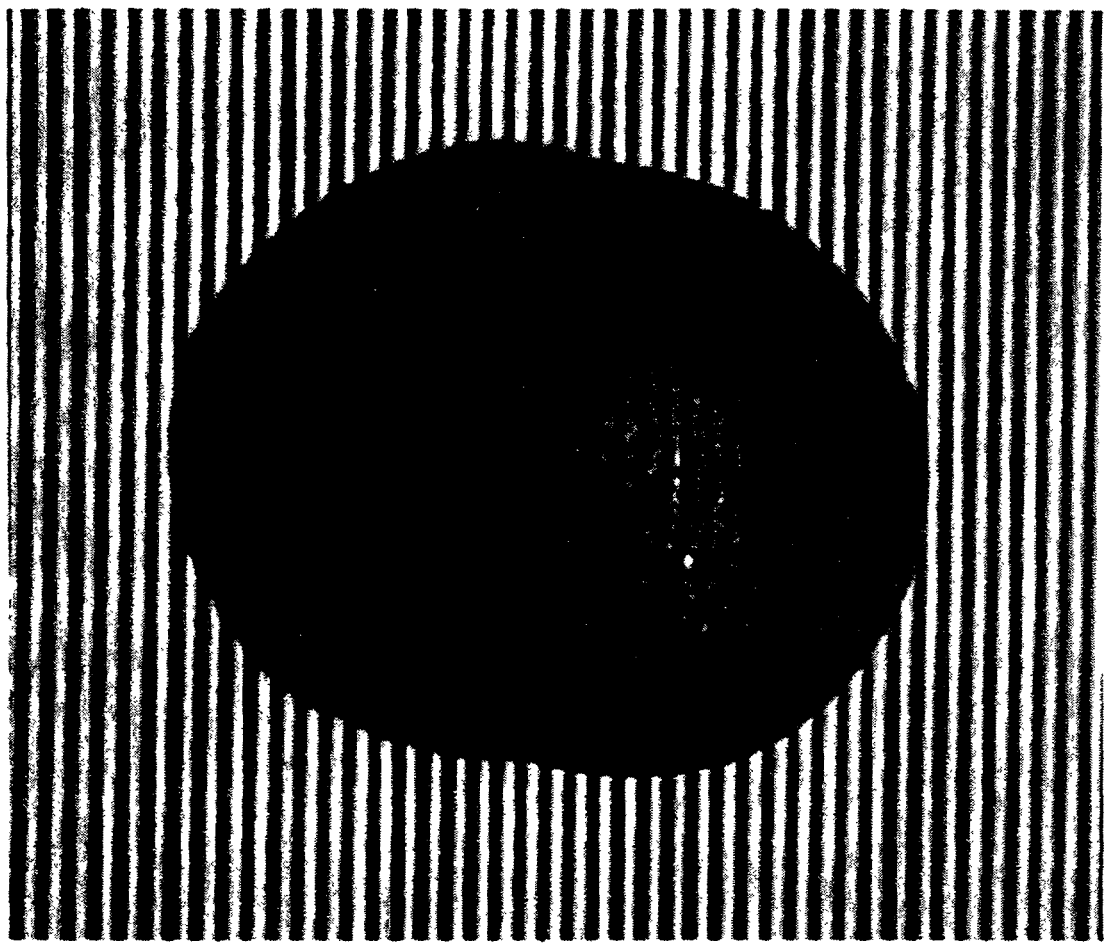
FIG. 8 is an image of the sphere of FIG. 5 mounted to the board, illuminated by the grid.

One of the images of the sphere 64 with the board 66, illuminated by the grid 24, can be seen in FIG. 8.

Since there is no difference in performing steps 100 to 108 with the object and with the reference object, and for concision purposes, these steps will not be described again by referring to the object.

Figure 9:
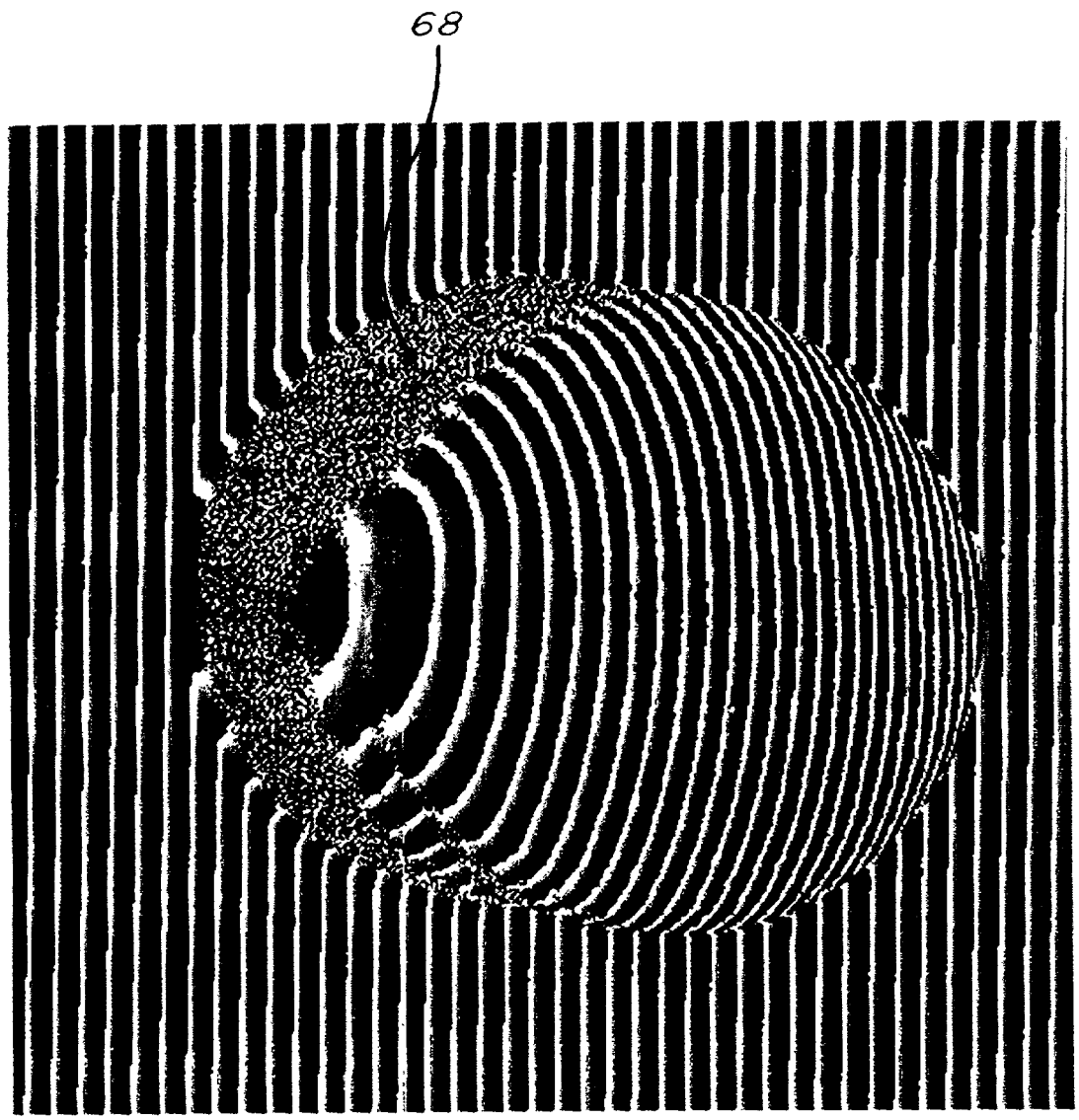
FIG. 9 is an image computed by the system of FIG. 1, representing the phase of the sphere with the board of FIG. 8.

The resulting phase of the sphere 64, with the board 66, is illustrated in FIG. 9. It is to be noted that the zone 68 in the image of FIG. 9 is caused by the shadow of the sphere 64.

Figure 10:
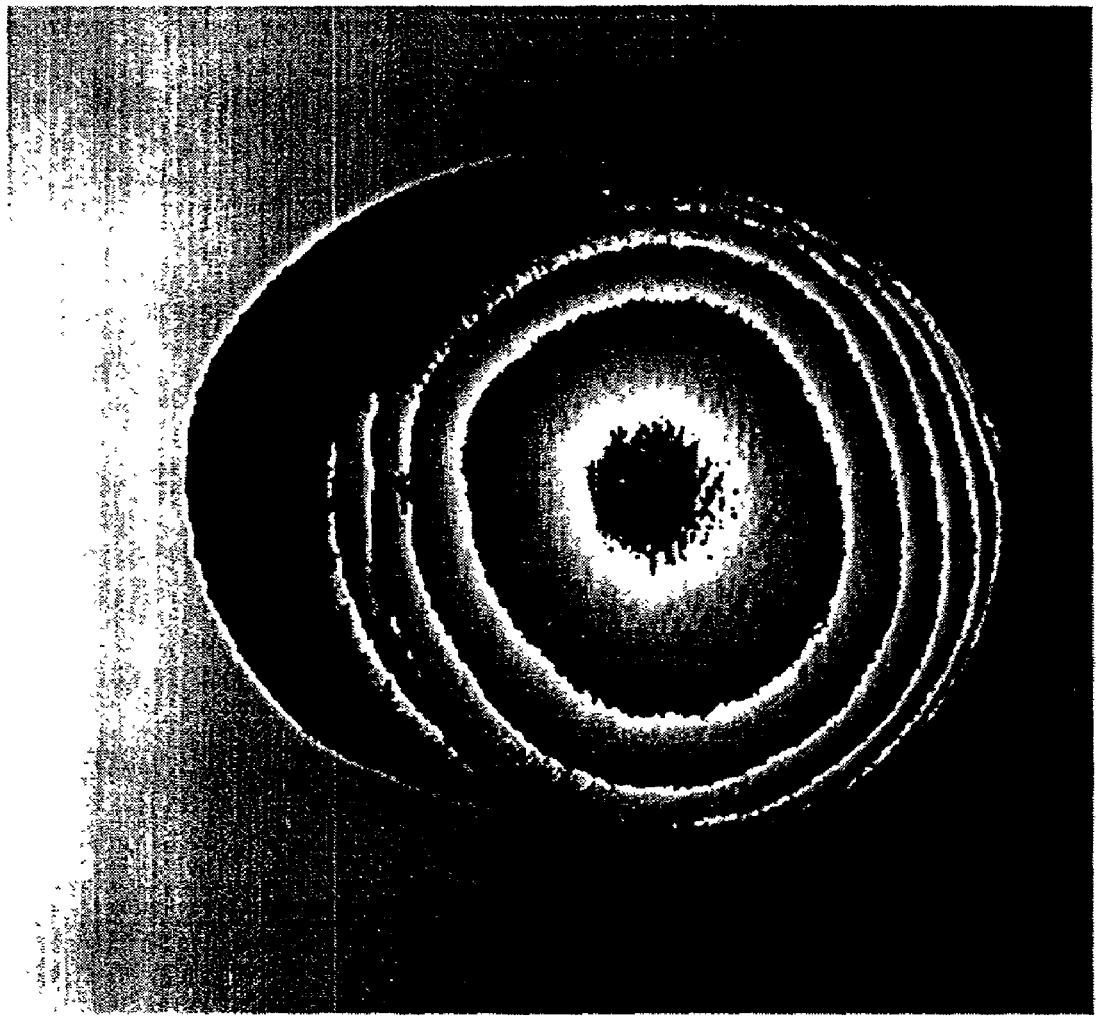
FIG. 10 is an image illustrating the phase variation between the images of FIGS. 7 and 9.

In step 112, the difference of height between the object 30 and the reference object is computed for every pixel, as obtained in step 108, by subtracting the phase of the reference object from the phase of the inspected object. The resulting image is shown in FIG. 10.

It is to be noted that the phases computed in step 108 for the object and for the reference object, and illustrated in FIGS. 7 and 9, correspond to surface phases relative to an imaginary projection plan.

When a non-parallel projection of the grid 24 is done, this imaginary projection plan becomes slightly curved. This is not detrimental with the method for measuring the relief of an object according to the present invention since both the images of the object and of the reference object are taken with the same system 10.

Since the phases of the object and of the reference object at each pixel correspond to the difference of height between the object (or the reference object) and the same imaginary projection plane (since the same system with the same optical set-up is used), their subtraction yields the difference of height between the object and the reference object. This allows the image acquisition of the object and of the reference object to be performed under different illumination.

In the optional step 114, the relief of the object, i.e. its height, is determined for each pixel using the difference of height at every pixel between the object and the reference object and knowing the dimensions of the reference object.

As will now appear obvious to a person of ordinary skills in the art, a method according to an embodiment of the present invention can be used to measure the difference of height between two objects (one being the reference). In this case, step 114 is obviously not performed.

In some applications, it may be advantageous to use a plane surface on which the object to measure will be laid on during measurement as the reference object.

In some applications, it may be advantageous to provide the system 10 with a registration system to help position the object and the reference object to a known position relative to the camera. Indeed, since a comparison between the object and the reference object is performed for each pixel, a registration system may ensure that corresponding points are compared.

Such registration system may take many forms including indicia on plane surface, a stand or a software program implemented in the computer.

It is to be noted that the images may be first acquired and then processed at a future time without departing from the spirit of the present invention.

As will be apparent upon reading the present description, a method, according to an embodiment of the present invention, allows the measure of the relief of an object using white light.

Although the present invention has been described with an example where spherical objects are measured, it allows the inspection and measurement of objects having other configurations.

The same object may also act as the reference object when the system 10 is used to study the variation in time of an object's relief.

Alternatively, the reference object may be replaced by a computer model of the object, generated, for example, by a Computer Assisted Design (CAD) that would have been virtually positioned according to the set-up of the system 10.

The reference object may also be a similar object having defects within acceptable parameters. Hence, the subtraction of the phases of the object and of the reference object will set forth the defect of the object under inspection. This aspect of the invention is particularly interesting to inspect the relief of an object having important variations of relief.

Indeed, since the phase values are limited in the range 0 to $2\pi$ the maximum height $h_0$ that can be detected by most systems of the prior-art is $$h_0 = \frac{p}{\tan(\theta)}. \quad \text{(see Equation 2)}$$

Usually the unwrapping of phase is done by using a grid having a pitch p sufficiently large to ensure that all height variations will be in a single-phase order (0 to $2\pi$).

A drawback to this is the loss of precision that it implies. For example, if the object to be measured is tilted according to the image acquisition apparatus, the lost of precision may be important.

The following example will illustrate how a method according to the present invention allows prevention of the above drawback and relates to lead coplanarity inspection on a circuit board.

Figure 11:
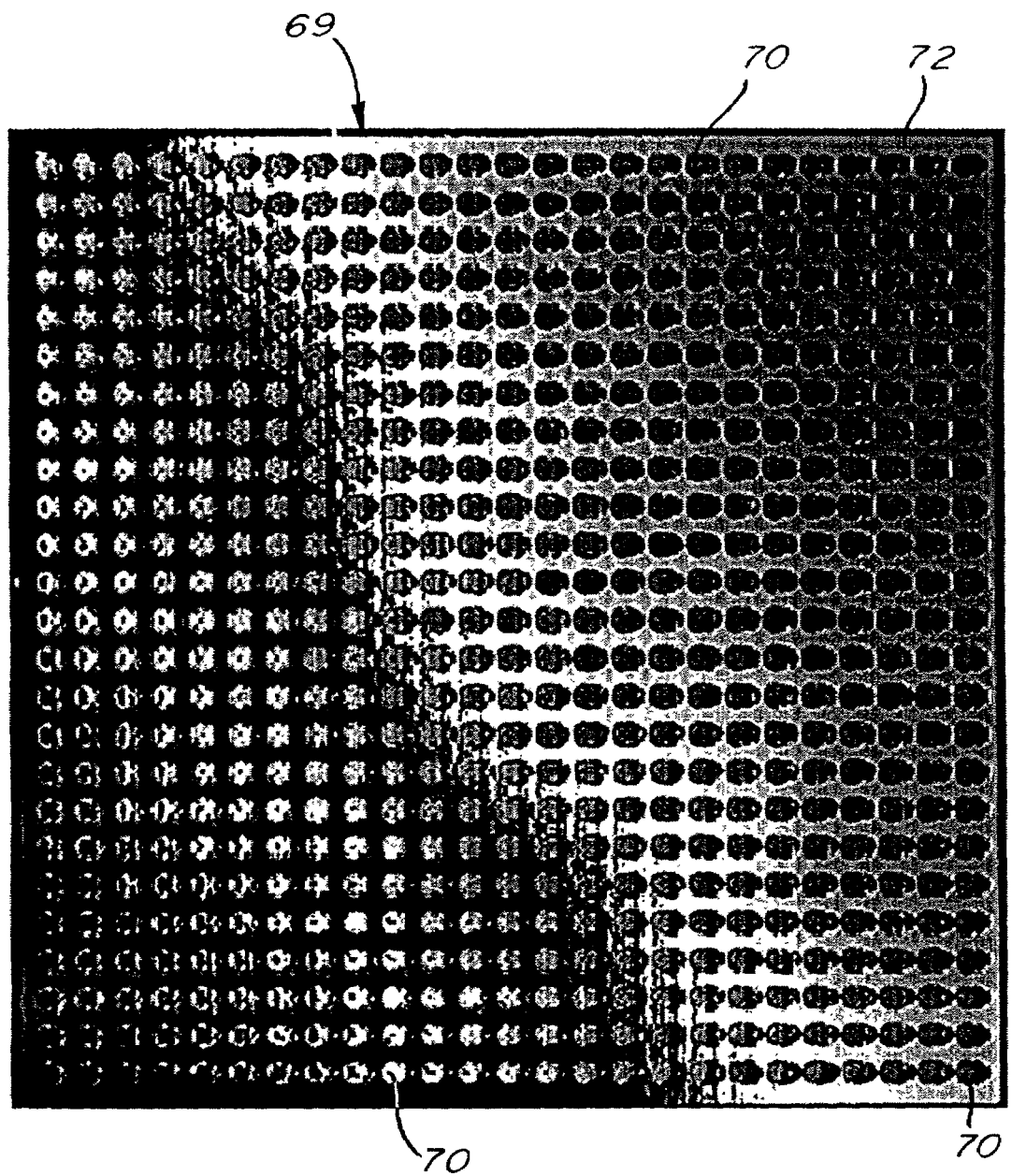
FIG. 11 is an image representing the phase variation between a module comprising lead balls on a substrate and a reference surface.

FIG. 11 is an image showing the relief of a module 69 comprising a plurality of lead balls 70 on a substrate 72. The image of FIG. 11 is obtained by performing steps 110 to 114 of FIG. 4. In this example, the object is the module 69 (including the substrate 72 and the lead balls 70) and the reference object is a reference plane surface (not shown).

It can be seen in FIG. 11, by the variation in the grey shade in the image, that the substrate 72 is not parallel to a plane surface. Therefore, such image provides less precision in measuring the height of the object than if the substrate would have been plane. Indeed, it is to be noted that the tilt in the substrate 72 on the image is not caused by the system 12, but reflects the actual configuration of the substrate 72. The small variation in height of each lead ball 70 may be lost in the overall variation in the substrate 72 profile.

Although one can conceive a computer algorithm to virtually rectify the substrate on the image, such algorithm may add to the inspection process time. This can be seen as a drawback when the inspection is performed in real-time on a production line.

The proposed solution is to use an approximation of the surface of the substrate as a second reference object.

Indeed, it may be advantageous, at each pixel, to first find the height of the substrate 72 relative to a plane surface, secondly the height of the lead balls 70 relative to the substrate 72 and to finally add these two heights to provide the overall height of the object, i.e. the substrate with the balls.

Figure 12:
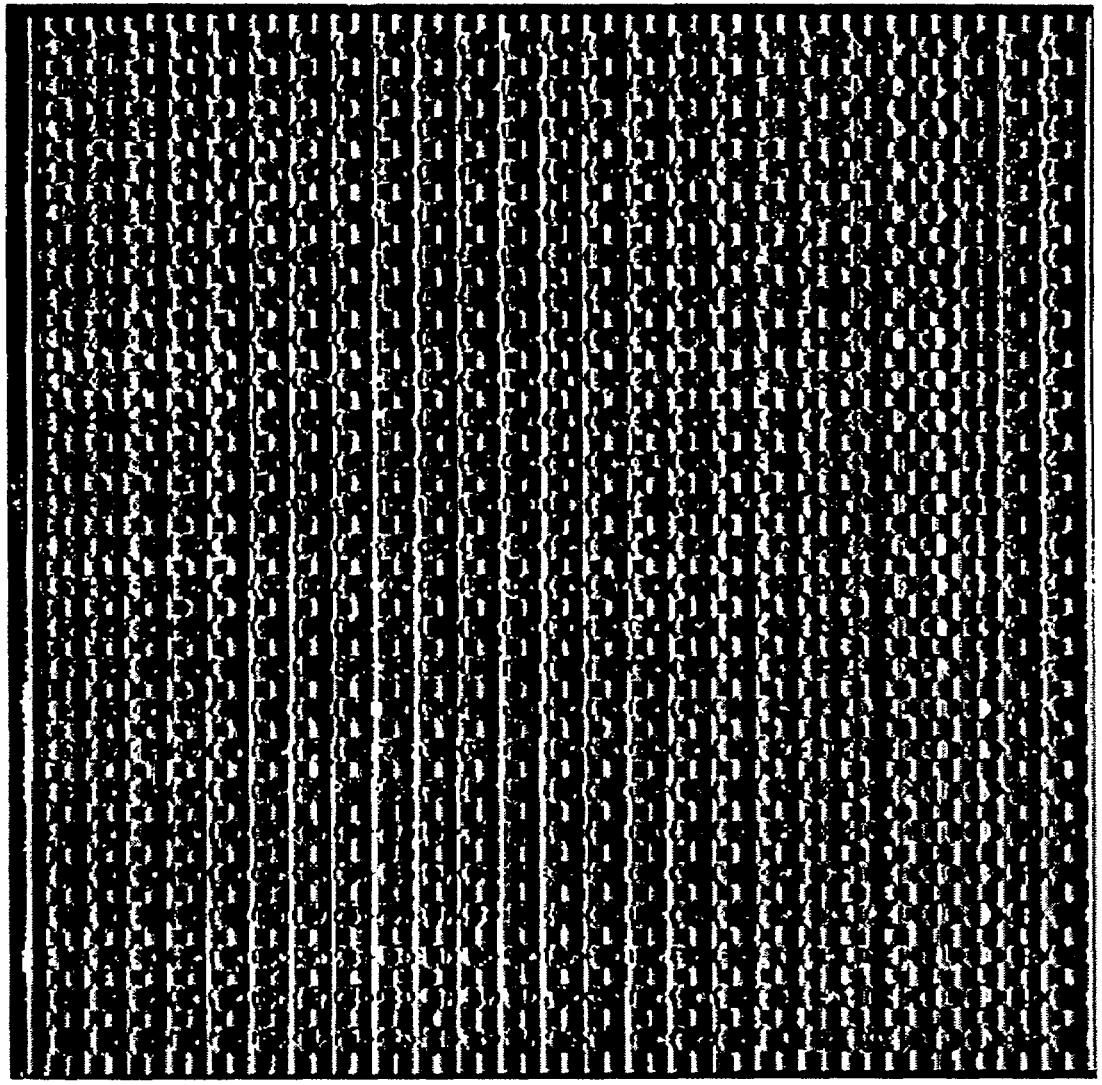
FIG. 12 is an image representing the phase of the module of FIG. 11.

The phase of the module is illustrated in FIG. 12 and is obtained through steps 100 to 108 of the method of FIG. 4.

Information about the surface of the substrate 72 is then obtained by analyzing the pixel corresponding to the substrate 72 (between the balls 70) on the image of FIG. 12 where a pseudo-phase image of a complementary surface is computed.

The height of the balls 70 is computed for each pixel (step 112) by subtracting the phase of the module (FIG. 12), and the phase of the complementary surface. The resulting image can be seen in FIG. 13.

Figure 14:
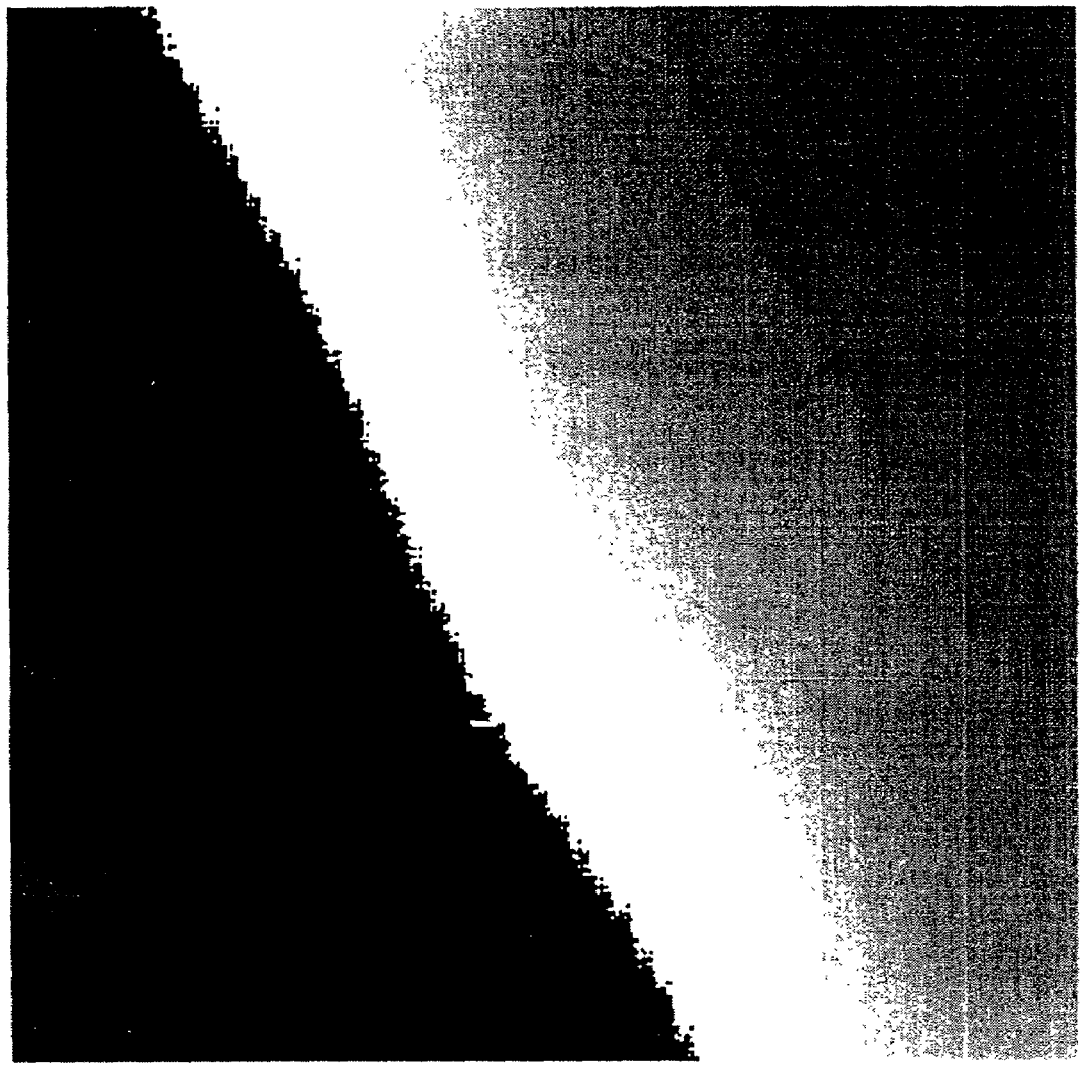
FIG. 14 is an image representing the phase variation between the phases of the images of the complementary surface and the reference plane.

Similarly, the height of the substrate 72 is computed for each pixel (step 112) by subtracting the phase of the complementary surface and the phase of the reference plane. The resulting image can be seen in FIG. 14. This phase image is then unwrapped (see FIG. 15).

Figure 13:
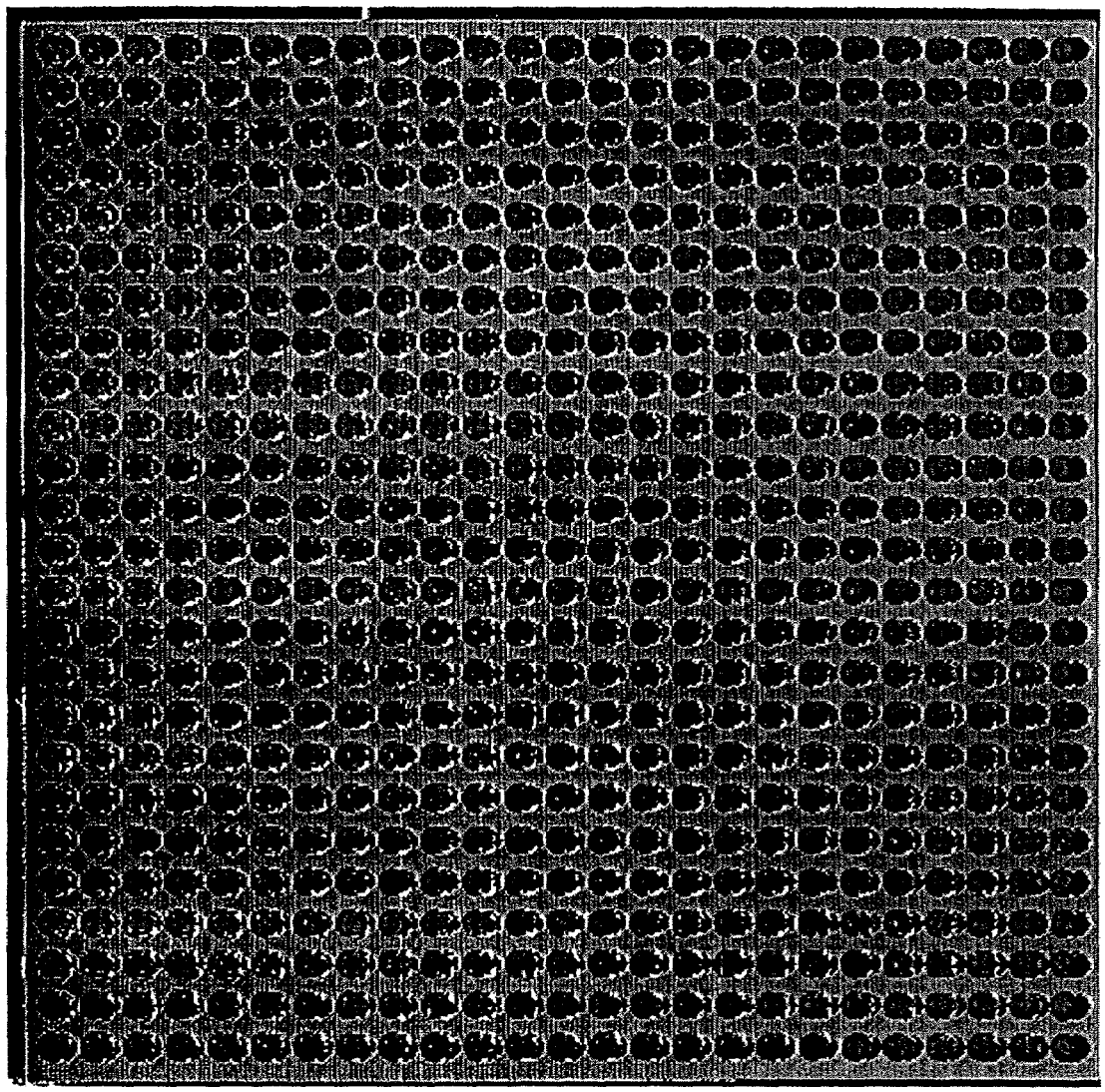
FIG. 13 is an image representing the phase variation between the phase of the image of FIG. 12 and the phase image of a complementary surface.
Figure 15:
FIG. 15 is the image of FIG. 14 after unwrapping.

The height of the module 69 is then obtained by adding the height of the phases of FIGS. 13 and 15.

Although the present invention has been described hereinabove by way of preferred embodiments thereof, it can be modified without departing from the spirit and nature of the subject invention, as defined in the appended claims.

What is claimed is:

1. A method for measuring the relief of an object using a camera provided with an array of pixels, said method comprising the steps of:
   a) projecting a grid on a reference object; the grid being located at a first position relative to the camera and to the reference object;
   b) taking, with the camera, an image of the reference object illuminated by said projected grid; said image of the reference object having intensity values for each pixel;
   c) repeating steps a) and b) at least two times with the grid being located at two different known positions relative to the camera and to the reference object to yield at least three intensity values for each pixel;
   d) computing the reference object phase for each pixel using the at least three reference object intensity values for the corresponding pixel;
   e) projecting the grid on the object; the grid being located at said first position;
   f) taking with the camera an image of the object illuminated by said projected grid; said image of the object having intensity values for each pixel position;

g) repeating steps e) and f) at least two times with the grid being located at said two different positions to yield at least three intensity values for each pixel;

h) computing the object phase for each pixel position using the at least three object intensity values for the corresponding pixel; and i) computing the difference of height between the object and the reference object for each pixel using said reference object phase and said object phase for the corresponding pixel; and j) using said difference of heights between the object and the reference object for each said pixel to determine the relief of the object.

2. A method as recited in claim 1, wherein, in at least one of steps d) and h), the phase $\Delta\Phi$ is computed for each pixel by solving the following system of equations:

$$I_n = A + B \cdot \cos(\Delta\Phi + \Delta\phi_n)$$

where $I_n$ represent the at least three intensity values, A and B are known coefficients and $\Delta\phi_n$ are phase variations caused by the different locations of the grid.

3. A method as recited in claim 2, wherein said system of equations is solved using a numerical method.

4. A method as recited in claim 1, wherein, in step c), steps a) and b) are repeated more than two times with the grid being located at more the two different known positions relative to the camera and to the reference object to yield said at least three intensity values and at least one additional value for each pixel and, in step d), a selection is performed among the at least three intensity values and the at least one additional values to yield the three most advantageous intensity values; said three most advantageous intensity values being used to compute the reference object phase for each pixel.

5. A method as recited in claim 4, wherein, in step c), steps a) and b) are repeated more than two times with the grid being located at more than two different known positions relative to the camera and to the reference object to yield more than tree intensity values and, in step d), the three most advantageous values from said more than three most advantageous intensity values are used to compute the reference object phase for each pixel.

6. A method as recited in claim 1, wherein, in step g), steps e) and f) are repeated more than two times with the grid being located at more than two different known positions relative to the camera and to the object to yield said at least three intensity values and at least one additional value for each pixel and, in step h), a selection is performed among the at least three intensity values and the at least one additional values to yield the three most advantageous intensity values and said three most advantageous intensity values are used to compute the object phase for each pixel.

7. A method as recited in claim 1, wherein, in step g), steps a) and b) are repeated more than two times with the grid being located at more than two different known positions relative to the camera and to the object to yield more than three intensity values and, in step c) the three most advantageous values form said more than three intensity values are used to compute the object phase for each pixel.

8. A method as recited in claim 1, wherein, in step c), said two known positions of the grid are chosen so as to provide at least two images of the object having a 180 degrees difference in phase therebetween.

9. A method as recited in claim 8, wherein a two-dimensional image of the object is computed by subtracting said at least two images of the object having a 180 degrees difference in phase therebetween; said two dimensional image being used to perform a preliminary analysis of the object.

10. A method as recited in claim 1, wherein, in step g), said two known positions of the grid are chosen so as to provide at least two images of the reference object having a 180 degrees difference in phase therebetween.

11. A method as recited in claim 1, wherein a two-dimensional image of the reference object is computed by subtracting said at least two images of the reference object having a 180 degrees difference in phase therebetween; said two dimensional image being used to perform a preliminary analysis of the reference object.

12. A method as recited in claim 1, wherein said reference object is a plane surface.

13. A method as recited in claim 1, wherein said reference object is said object at a past predetermined time and said reference object phase is computed around said past time; whereby step i) provides the variation of height at each pixel between said past time and take approximate time when the object phase is computed and said step j) yields the variation with time of relief of the object.

14. A method as recited of claim 1, wherein said reference object is a CAD of the object; said grid being virtually positioned and projected into said CAD in step a) and said image of said reference object being simulated in step b).

15. A system for measuring the relief of an object, said system comprising:
   a grid projecting assembly;
   an image acquisition apparatus including a camera provided with an array of pixels;
   a computer configured for
      a) receiving from the image acquisition apparatus at least three images of the projected grid onto the object and at least three images of the projected grid onto the reference object; each of said images of the projected grid onto the object corresponding to a different known position of the grid; each of said images of the projected grid onto the reference object corresponding to one of said known positions of the grid;
      b) computing the reference object phase for each pixel using the at least three reference object intensity values for the corresponding pixel;
      c) computing the object phase for each pixel using the at least three object intensity values for the corresponding pixel; and
      d) computing the difference of height between the object and the reference object for each pixel using said reference object phase and said object phase for the corresponding pixel; and
      e) using said difference of heights between the object and the reference object for each said pixel to determine the relief of the object.

16. The use of the method of claim 1 for lead-coplanarity inspection.

* * * * *